United States Patent
Larson et al.

(10) Patent No.: US 8,816,974 B2
(45) Date of Patent: Aug. 26, 2014

(54) SYSTEMS AND METHODS FOR SMUDGE CONTROL FOR TOUCH SCREEN HUMAN INTERFACE DEVICES

(75) Inventors: Brent D. Larson, Cave Creek, AZ (US); Sonia R. Dodd, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 668 days.

(21) Appl. No.: 13/118,209

(22) Filed: May 27, 2011

(65) Prior Publication Data

US 2012/0299840 A1 Nov. 29, 2012

(51) Int. Cl.
*G06F 3/041* (2006.01)

(52) U.S. Cl.
CPC .................................. *G06F 3/041* (2013.01)
USPC ....................................................... 345/173

(58) Field of Classification Search
None
See application file for complete search history.

(56) References Cited

U.S. PATENT DOCUMENTS

| | | | |
|---|---|---|---|
| 4,855,176 A * | 8/1989 | Ohwaki et al. | 428/195.1 |
| 5,879,217 A | 3/1999 | Saito | |
| 6,660,388 B2 | 12/2003 | Liu | |
| 7,472,999 B2 | 1/2009 | Suga | |
| 7,889,284 B1 | 2/2011 | Nemeth | |
| 2001/0055529 A1 | 12/2001 | Wixforth | |
| 2008/0095997 A1 | 4/2008 | Chiang | |
| 2008/0100584 A1 | 5/2008 | Hague | |
| 2008/0266766 A1 | 10/2008 | D'Orso | |
| 2009/0123699 A1 | 5/2009 | Maniar | |
| 2009/0191374 A1 | 7/2009 | D'Orso | |
| 2009/0197048 A1 | 8/2009 | Amin | |
| 2010/0033818 A1 | 2/2010 | Petcavich | |
| 2010/0119774 A1 | 5/2010 | Ogawa | |
| 2010/0285275 A1 * | 11/2010 | Baca et al. | 428/141 |
| 2010/0304086 A1 | 12/2010 | Carr | |

* cited by examiner

*Primary Examiner* — Joseph Haley

(74) *Attorney, Agent, or Firm* — Fogg & Powers LLC

(57) ABSTRACT

Systems and methods for smudge control for touch screen human interface devices are provided. In one embodiment, a touch screen human interface device comprises: a touch sensitive display surface, the touch sensitive display surface including a first region having a first surface energy with respect to a contaminant material; and a pattern of a plurality of nucleation sites distributed within the first region, wherein each of the plurality of nucleation sites possesses a second surface energy that is higher than the first surface energy with respect to the contaminant material.

17 Claims, 9 Drawing Sheets

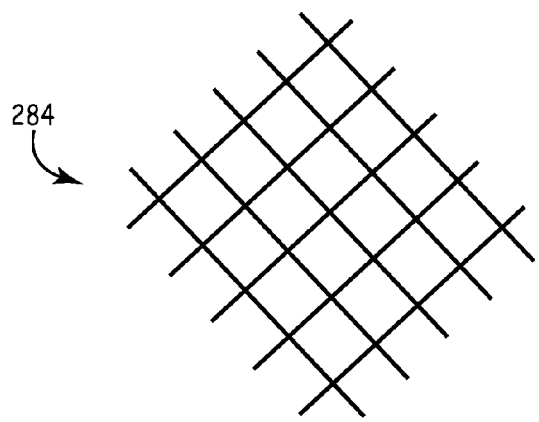
FIG. 2F
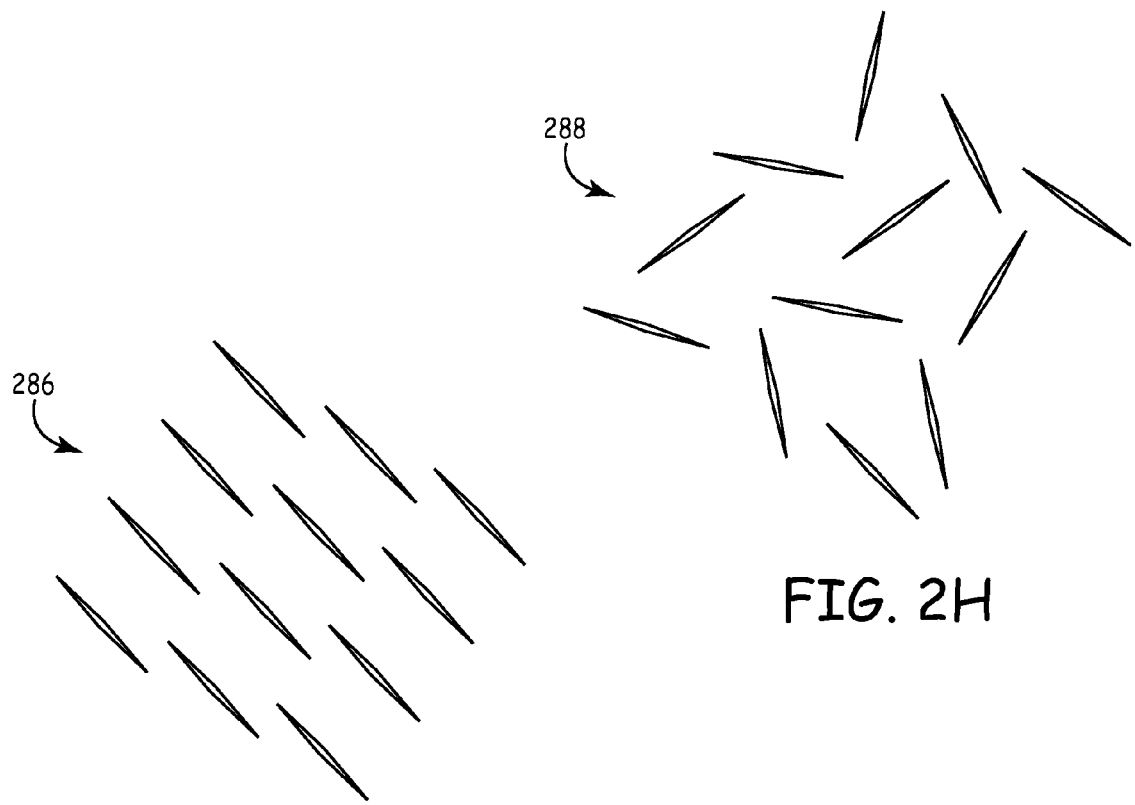
FIG. 2H
FIG. 2G

SYSTEMS AND METHODS FOR SMUDGE CONTROL FOR TOUCH SCREEN HUMAN INTERFACE DEVICES

BACKGROUND

Touch screen displays are human interface devices that allow individuals to provide input to a computer system by physically touching specific regions of the display with their fingers. The regions selected will correlate to the input they wish to provide and will be visually identified on the display by specific text or graphics. Because human hands and fingers secrete oils and carry other contaminants, such materials are deposited on touch screen displays during the normal course of their operation. Deposits of such contaminants on the display increase reflectances which can eventually render the display unusable when the user can no longer read information being displayed or determine which regions of the screen should be selected to provide a desired input.

For some applications, such as portable personal electronic devices, this degradation may not be critical because the purpose of the device is a matter of personal convenience and not critical to the operation of machinery or safety. In addition, touch screen displays on portable personal electronic devices are easily cleaned, such as by wiping the screen clean using an available article of clothing. In other applications such as aircraft avionics systems or industrial plant control rooms, opportunities to clean displays are much more limited. For example, a flight crew should be able to concentrate on priorities higher than periodically cleaning their instrumentation when their aircraft is in flight. Further, cleaning touch screen displays that control in service equipment is not desired because of the risk of inadvertently activating or de-activating system functions or altering configurations. Low surface energy films which are oleophobic have been introduced that partially address the issue of contaminant induced reflectances on touch screen displays. However, while such films often mitigate against increases in specular reflectances, they tend to increase the development of diffuse reflectances, which also negatively affect optical performance of the display.

For the reasons stated above and for other reasons stated below which will become apparent to those skilled in the art upon reading and understanding the specification, there is a need in the art for improved systems and methods for smudge control for touch screen human interface devices.

SUMMARY

The Embodiments of the present invention provide methods and systems for smudge control for touch screen human interface devices and will be understood by reading and studying the following specification.

In one embodiment, a touch screen human interface device comprises: a touch sensitive display surface, the touch sensitive display surface including a first region having a first surface energy with respect to a contaminant material; and a pattern of a plurality of nucleation sites distributed within the first region, wherein each of the plurality of nucleation sites possesses a second surface energy that is higher than the first surface energy with respect to the contaminant material.

DRAWINGS

Embodiments of the present invention can be more easily understood and further advantages and uses thereof more readily apparent, when considered in view of the description of the preferred embodiments and the following figures in which:

FIG. 1 is a diagram illustrating a human interface device of one embodiment of the present invention having a pattern of nucleation sites distributed across a touch sensitive display surface;

FIGS. 2A-C illustrate embodiments of an alternative pattern of star shaped nucleation sites;

FIGS. 2D-I illustrate embodiments of alternative shapes and configurations for nucleation sites;

In accordance with common practice, the various described features are not drawn to scale but are drawn to emphasize features relevant to the present invention. Reference characters denote like elements throughout figures and text.

DETAILED DESCRIPTION

Figure 1:
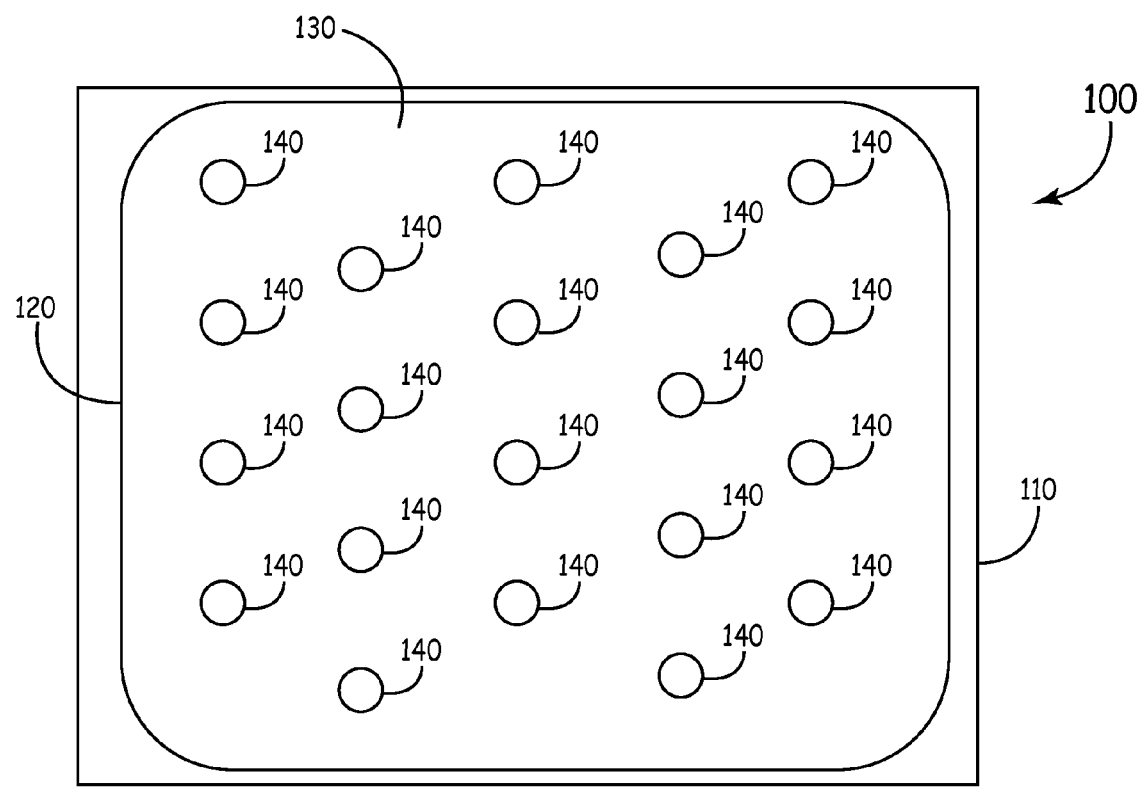

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

As would be appreciated by one of ordinary skill in the art after reading this disclosure, when a finger print is applied to a low surface energy oleophobic surface, the oils that form the print will tend to bead up into little droplets. If such a print is instead applied to a high surface energy oleophilic surface, the oils are less likely to bead up and can instead spread out creating a high reflection region, especially noticeable on a surface whose reflectance is normally low. Surface energy is often measured in terms of a contact angle between a particular contaminant and a surface. As surface energy decreases, the contact angle between the contaminant and the surface increases. That is, oils prefer not to touch oleophobic surfaces and therefore bead-up (by reducing the radius of curvature) to reduce their contact area with that surface. In contrast, oils are less averse to touching oleophilic surfaces and therefore increase their contact area with such surfaces by spreading out.

Embodiments of the present invention take advantage of both of these phenomena by providing for a touch screen display that possesses a pattern of differing surface energy regions in the form of nucleation sites on the surface of the display that will attract and accumulate contaminant materials. As the term is used in this specification, a nucleation site is a region having a difference in surface energy with respect to a surrounding region such that contaminants of concern will tend to stay in the nucleation site rather than spread to the surrounding region. In one embodiment, in terms of contact angle difference between the high surface energy regions of a nucleation site and a surrounding low surface energy region for the contaminant, a contact angle difference for the contaminant is preferably greater than 10 degrees, and more preferably greater than 20 degrees. Contaminants may include moisture, finger oils and other materials which are transferred from the user to the touch screen surface. With these nucleation sites, relatively high surface energy wells are formed within a region having an otherwise low surface energy surface. The term "wells" is used since it is energetically more favorable for the contaminants to be in these areas. Once contaminants migrate from the low surface energy regions to the high surface energy wells, they will want to remain in those wells and not re-enter the low surface energy regions. Such contaminants will accumulate in the high surface energy wells and tend to remain there until a convenient time arrives to clean the display. As such, embodiments of the present invention allow control of contaminant accumulation and can significantly increase the usable time of touch screen displays between cleanings and increase the optical quality of the screen between cleaning.

FIG. 1 is a diagram illustrating generally at 100 a touch screen human machine interface device 110 of one embodiment of the present invention (also referred to herein simply as touch screen 110). Touch screen 110 is an electrical device that displays graphical images and text to a user via a touch sensitive display surface 120. As implied by its name, touch sensitive display surface 120 further functions as an input interface through which a user physically touches specific regions of the display to provide input.

The touch sensitive display surface 120 includes a pattern of nucleation sites 140 which have a higher surface energy for one or more contaminants than the region 130 of surface 120 through which they are distributed. In operation, contaminants that are applied to touch sensitive display surface 120 during normal use of touch screen 110 will be attracted to and collect at these nucleation sites 140 instead of being either spread out or beading up across surface 120 in an arbitrary manner.

One or both of two different mechanisms are in operation to bring contaminants to the nucleation sites 140. With respect to the first mechanism, as a user's fingers moves across the touch screen display, they will drag contaminants across the nucleation sites 140, where a significant amount will remain. In addition, the nucleation sites 140 can be configured to actively attract contaminants through net attractive forces created by patterns and/or surface energy gradients, as explained below.

In one embodiment of touch screen 110, the higher and lower surface energy regions formed across surface 120 are coplanar or at least very close to coplanar. Having coplanar regions is beneficial in terms of structural strength as well as cleanability, since microfiber or other cleaning/wiping structures will have easy access to reach parts of both regions. Substantially coplanar can be characterized as the lateral dimension(s) of the regions being much larger than the relative height differences between them (for example, one or two orders of magnitude). One preferred scenario is to differentiate the surface energy regions by the presence or absence of a thin (e.g., submicron) layer, in which case the relative height difference between regions is the thickness of that thin layer.

In other embodiments of touch screen 110, the surface 120 is textured or otherwise has topological variations. When contaminant levels are low, this type of textured pattern can keep contaminants distributed across a number of nucleation sites 140. Depending upon the surface energies and the particular pattern used, for some embodiments, surface 120 can comprise a somewhat stippled or ridged pattern, thereby having a surface topology somewhat analogous to a moderately controlled anti-glare surface. In the various embodiments described herein, feature sizes of nucleation site patterns can range from macroscopic (such as depicted in FIG. 1) down to subpixel or smaller with respect to the display. Again, careful selection of patterns, sizes and free energies can enable a degree of control over the light scattering distribution of the contaminant nucleation sites.

In FIG. 1, each of the nucleation sites 140 are illustrated as being evenly distributed circularly shaped surface energy wells. However, other patterns and distributions are potentially beneficial and are contemplated as within the scope of embodiments of the present invention. For example, alternate embodiments include nucleation sites 140 shaped as circles, diamond shapes, star patterns, spirals or other geometric shapes including stripes of various size, orientation and tapers. The pattern itself may be random and/or comprise interconnected nucleation sites 140. For example, for some embodiments, patterns known by those of skill in the art to reduced likelihood for Moiré interference would be utilized. Other embodiments employ a strategy of preferentially placing nucleation sites 140 over areas of surface 120 not used to display critical information in the displayed imagery (for example, having an increased density of nucleation sites between display regions used for critical data or symbology, at the perimeter of critical information areas, over slider bars, between lines of text, etc.). Further, as discussed below, in alternate embodiments nucleation sites 140 include gradient features or functionality, based on either spatial patterning gradients or continuous analog surface energy gradients. Any of the pattern options discussed herein should not be interpreted as being mutually exclusive. Instead, it should be understood that they may be utilized together in combination on a single surface 120.

Figure 2A:
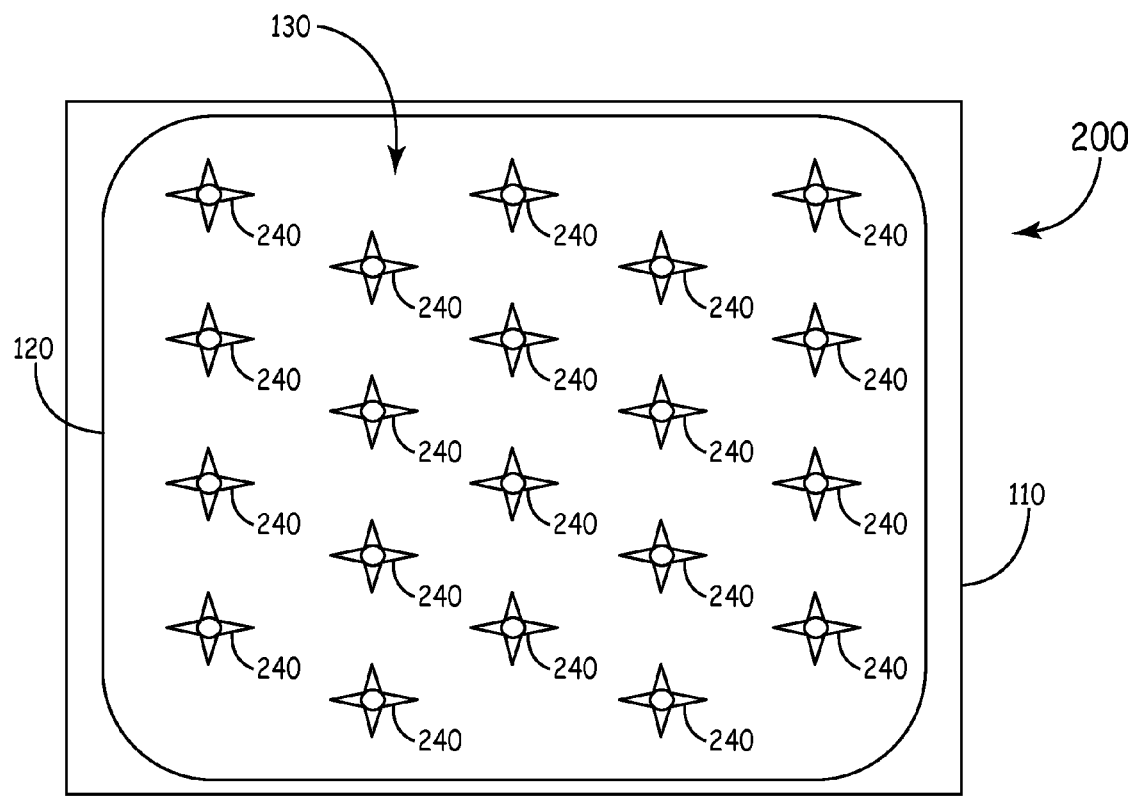
Figure 2B:
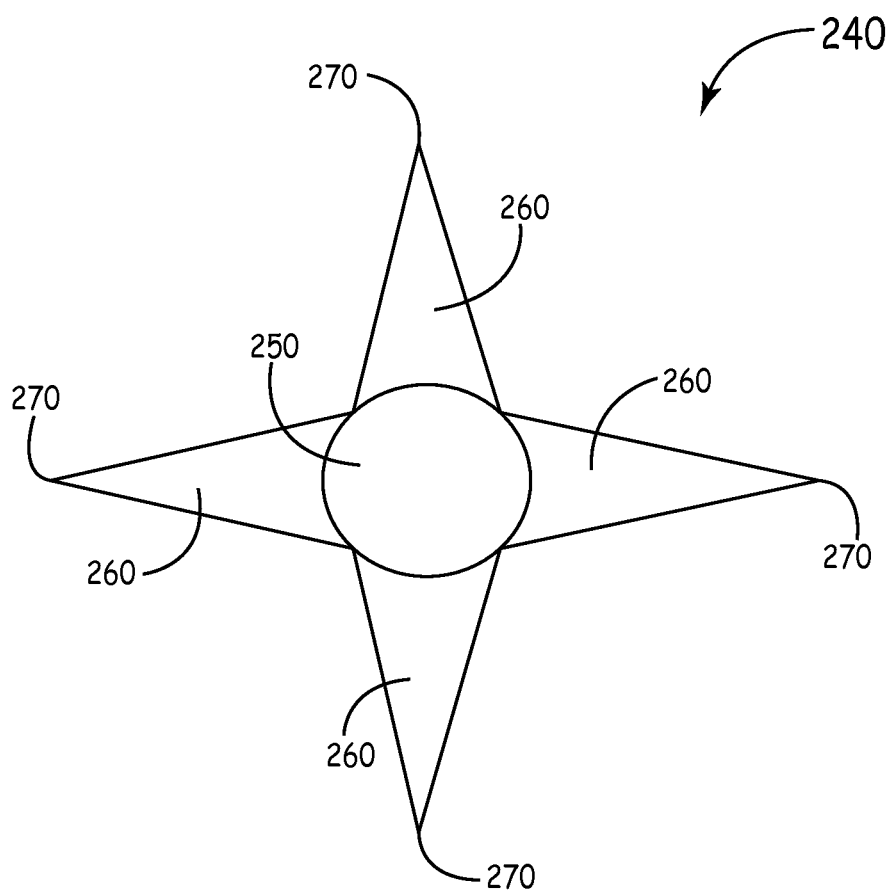

FIGS. 2A and 2B illustrate generally at 200 one alternative pattern where star shaped nucleation sites 240 are distributed across surface 120. As mentioned above, these star shaped nucleation sites 240 are potentially used in combination with any of the pattern options described above. Further, the features described with respect to FIGS. 2A and 2B can apply to any one or more of the nucleation sites 140 described with respect to FIG. 1. As before, nucleation sites 240 each have a higher surface energy than the region 130 of surface 120 through which they are distributed.

Referring to FIG. 2B, each of the nucleation sites 240 comprise a center hub 250 from which a plurality of tapered rays 260 emerge. As contaminants form or collect near the tip ends 270 of each ray 260, they will migrate due to net attractive forces to where the attraction is strongest (the center of the energy "well"), which will be at the center of the hub 250. That is, the contaminants will be repelled by the relatively low surface energy region 130 and attracted to the higher surface energy region of hub 250. For example, in the case of finger oils and where region 130 is oleophobic and the hub 250 and rays 260 are oleophilic, the oil droplets will desire to move in the direction where oleophilic properties are greater. While four tapered rays are shown, the number, orientation, length and possible curvature of the rays can be selected to optimize the resulting coverage and effectiveness of the distributed high surface energy regions.

Figure 2C:
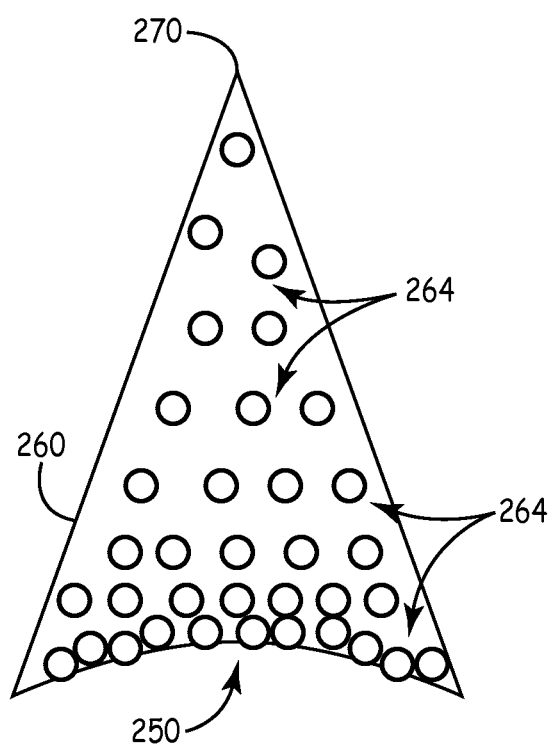

In one embodiment, nucleation sites 240 are uniform in surface energy across their hub 250 and ray 260 areas. In that case, the tapered geometric shape of a nucleation site 240 itself creates net attractive forces that pull a contaminate droplet from the rays 260 to the hub 250, especially as the droplet size increases to the point where it spans the local width of a ray 260. In other embodiments, the rays 260 are formed to have (or are replaced by) a continuous, stepped or half-tone modulated surface energy gradient starting from the tip end 270 of the ray or region that increases in surface energy towards the hub 250. In other words, as a contaminant droplet migrates from the tip 270 to the hub 250, the effective surface energy it encounters increases. In each of these cases, there is a migration of contaminants to the center of nucleation sites. In the case of a half-tone (fractional area) modulated surface energy gradient, a fill factor for high surface energy subregions 264 would increase from the tip 270 to the hub 250, as shown in FIG. 2C. In this case, each of the small subregions 264 would act as a local nucleation site until the droplets become large enough to span multiple subregions, and thus encounter the effect of the gradient. By having a collection of nucleation sites distributed across the display, embodiments of the present invention delay onset of degraded optical performance.

Figure 2D:
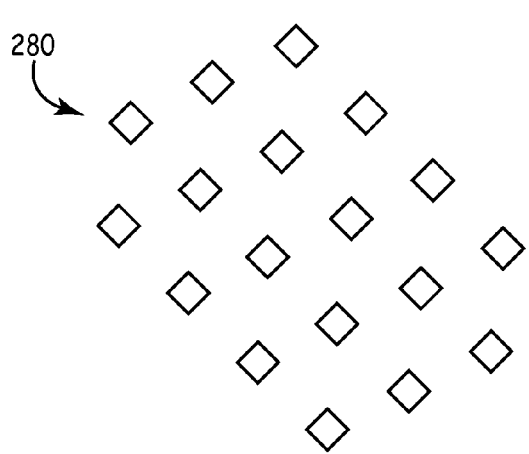
Figure 2E:
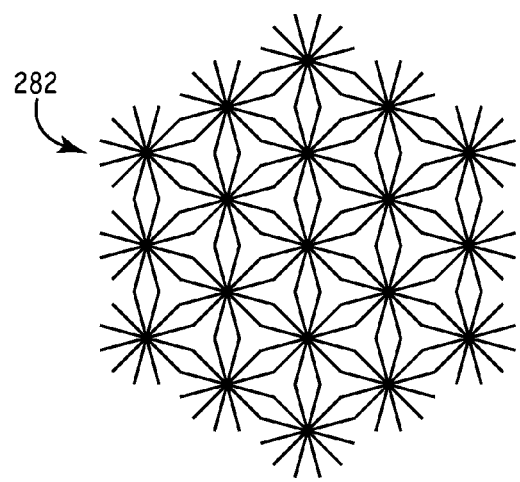

As mentioned above, alternate embodiments include nucleation sites shaped as circles, diamond shapes, star patterns, spirals or other geometric shapes including stripes of various size, orientation and tapers. FIGS. 2D-2H illustrate a few of those potential alternate shapes for nucleation sites. FIG. 2D shows a pattern of diamond shaped nucleation sites 280. FIG. 2E illustrates a pattern of nucleation sites 282 for from an interconnected array of 12 pointed star patterns. In both examples, tapers are applied to draw in contaminants. FIG. 2F illustrates a grid shaped nucleation site pattern 284 formed from intersecting lines of high surface energy subregions. FIG. 2G shows a pattern of parallel oriented elongated tapered nucleation sites 286. FIG. 2H illustrates a pattern of tapered nucleation sites 288 having the same shape as those in FIG. 2G, but are rotated in random direction with respect to each other. Surface energy gradients may apply to any of these alternatively shaped nucleation site, increasing in surface energy either towards the center of the nucleation site or any other selected part of the nucleation site.

Figure 2I:
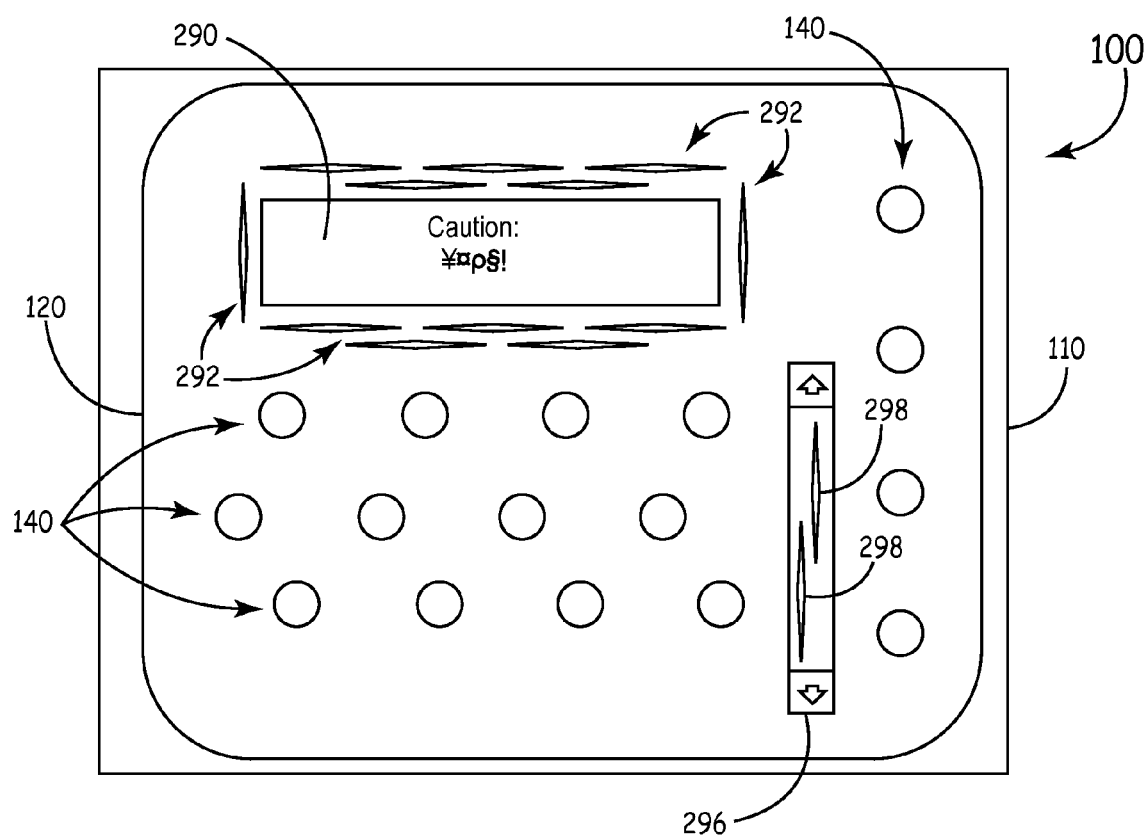

As mentioned above, other embodiments employ a strategy of preferentially placing nucleation sites over areas of surface 120 not used to display critical information in the displayed imagery. One such embodiment is described with respect to FIG. 2I. In FIG. 2I, surface 120 includes a region having a plurality of nucleation sited 140 distributed such as described above. In addition, there is a region 290 of surface 120 specifically used for displaying critical data or symbology. Here, an increased density of nucleation sites 292 are provided at the perimeters of critical information region 290 to help keep that region from optically degrading due to contaminants. In addition a slider bar 296 provides a means for the user to touch the screen surface 120 in order to scroll displayed information. Since that area will be routinely exposed to contaminants, nucleation cites 298 are provided directly over slider bar 296 to keep contaminants from spreading from that region. As such, visibility of displayed information in the presence of the contaminant material will vary across the display surface 120.

Figure 3:
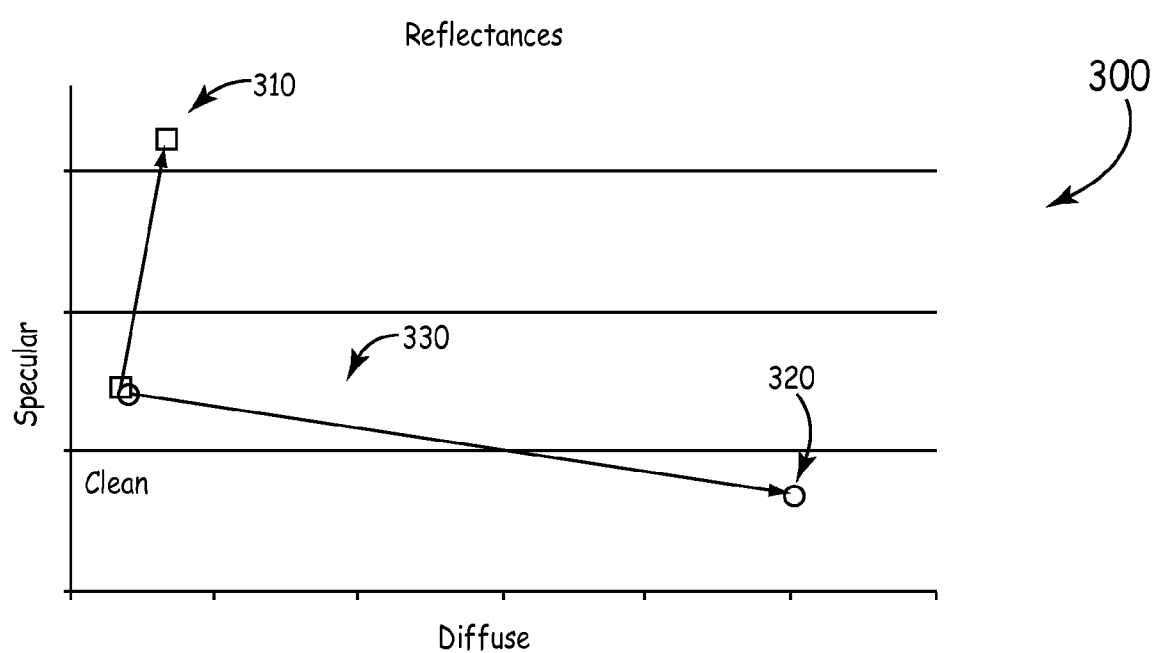
FIG. 3 is a chart illustrating specular and diffuse reflectances.

As illustrated by the graph 300 in FIG. 3, embodiments of the present invention further provide the benefit of managing both specular and diffuse reflectances. On graph 300, specular reflectance is plotted against the vertical axis while diffuse reflectance is plotted across the horizontal axis. Shown generally at 310, for display screens where no low surface energy anti-smudge technology is utilized, the screen will start clean. As it is used, oils will spread from fingers touching the screen which will increase specular reflections, especially on a surface having an antireflective coating. For screens where a low surface energy anti-smudge technology is applied across the entire surface of the screen, contaminants will bead up which increases diffuse reflections, as shown generally at 320. Embodiments of the present invention are advantageous in that they delay and limit the onset of both specular and diffuse reflectances (illustrated by the region shown at 330). Having a low surface energy region across much of the area of the display screen greatly reduces the formation of specular reflectances. Introducing a pattern of nucleation sites attracts and holds contaminants in surface energy wells and can reduce the formation of diffuse reflectances by controlling the size and distribution of the droplets.

Embodiments having a display surface where 10% of the area comprises nucleation sites and 90% of the area is a low surface energy region provide a reasonable ratio for a large number of applications. Having more or less than 10% may be appropriate for different applications. In particular, the ratio of high surface energy to low surface energy regions for a particular application is readily determined by one of ordinary skill in the art who has read this specification based on the intended use of the display, how often cleaning can be performed, and taking into consideration any screen textures that may exist. As mentioned above, the particular ratio used will potentially impact the mix of specular versus diffuse reflections exhibited by a contaminated surface.

Further, the particular materials used to form the relative high and low surface energy regions will also vary. In one embodiment, a thin fluorocarbon material film (e.g. having surface energy analogous to materials such as polytetrafluoroethylene) is applied to realize the low surface energy regions for contaminants such as finger oils or moisture. Regions where the film is absent and the substrate is exposed would be relatively high surface area regions. In other embodiments, specific materials are applied to create high surface energy regions, such as glass or $SiO_2$. In still other embodiments, a surface material having a nanostructured surface profile is implemented to lower the effective surface energy and increase the contact angle in the low surface energy regions. The selection of what materials to use would be based on what predominant contaminants are expected for the particular application. For example, the cockpit of a modern aircraft is a relatively clean environment so that the primary contaminant of concern is the oil present on human skin. In contrast, for a control panel in an industrial plant, a touch screen user's hands may be routinely exposed to other materials that would be the primary contaminant, or at least an additional potential contaminant. As such, the particular materials selected could vary accordingly.

Figure 4:
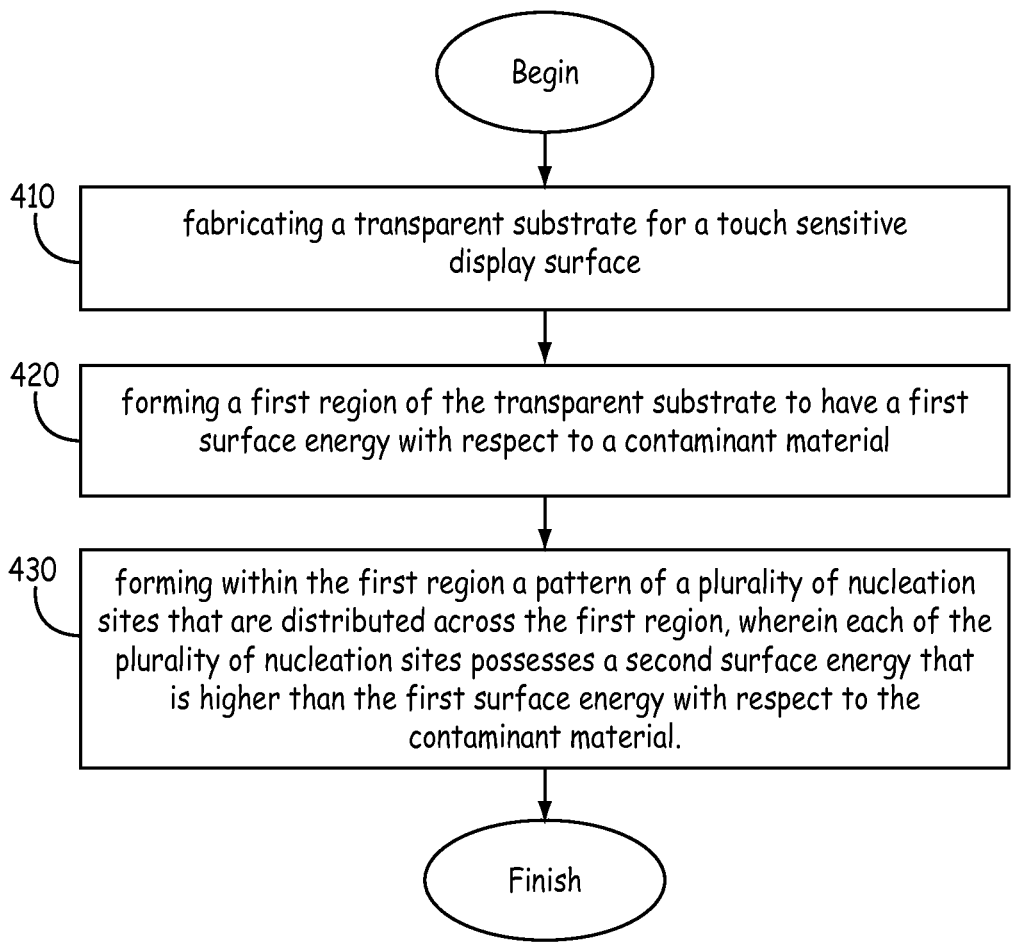
FIG. 4 is a flow chart illustrating a method of one embodiment of the present invention.

Various fabrication methods are possible for fabricating embodiments of the present invention. FIG. 4 is a flow chart illustrating a method for providing smudge control for a touch screen human interface device of one embodiment of the present invention. The method described in FIG. 4 is applicable to the embodiments described with respect to FIGS. 1 and 2A-I above.

The method begins at 410 with fabricating a transparent substrate for a touch sensitive display surface and proceeds to 420 with forming a first region of the transparent substrate to have a first surface energy with respect to a contaminant material. In one embodiment, the transparent substrate comprises the surface of the touch sensitive display. In other embodiments, the transparent substrate is a film or other material that will be applied to the surface of the touch sensitive display. In one embodiment, the first region comprises a low surface energy material (such as a film, coating or spray) applied to a substrate of the display surface. The method proceeds to 430 with forming within the first region a pattern of a plurality of nucleation sites that are distributed across the first region, wherein each of the plurality of nucleation sites possesses a second surface energy that is higher than the first surface energy with respect to the contaminant material. In one embodiment, each of the plurality of nucleation sites comprises a relatively high surface energy area where the low surface energy material formed in 420 has been removed to re-expose the underlying substrate (e.g. glass) or other underlying film or coating (e.g., antireflection coating).

In another embodiment, fabricating the pattern of a plurality of nucleation sites comprises removing portions of a low surface energy material applied in 420 and applying a high surface energy material where the portions of low surface energy material were removed. In alternate embodiments, the process at blocks 420 to 430 are achieved using techniques such as, but not limited to photolithography, screen printing, masked deposition, spray-on techniques, and the like. Further, in some alternate embodiments, the order in which the blocks are performed may be varied.

As discussed above, in one embodiment, a touch screen human interface device resulting from the method in FIG. 4 results in a touch screen display that possesses a pattern of differing surface energy regions that create nucleation sites on the surface of the display that will attract and accumulate contaminant materials such as moisture, finger oils and other materials which are transferred from the user to the touch screen surface. The relatively high surface energy nucleation sites formed on or within a region of otherwise low surface energy surface act as surface energy wells that attract and contain contaminants. Once contaminants migrate from the low surface energy regions to the high surface energy wells, they will tend to remain in those regions and not migrate back into low surface energy regions. These contaminants will tend to accumulate in the nucleation sites and remain there until a convenient time arrives to clean the display.

In one embodiment, in block 430, the plurality of nucleation sites are randomly distributed across the first region. In one embodiment, a pattern known by those of skill in the art to reduce likelihood for Moiré interference with a matrix display is utilized to distribute nucleation sites. In another embodiment, a shape known by those of skill in the art to reduce likelihood for Moiré interference with a matrix display is utilized as the shape of the distributed nucleation sites. In yet another embodiment, the plurality of nucleation sites are preferentially distributed in areas which are least likely to interfere with visibility of certain displayed symbols or images.

In one embodiment, the plurality of nucleation sites are each coplanar on the display surface with the first region. In other embodiments, the touch sensitive display surface is textured. The nucleation sites can be geometrically shaped surface energy wells, having shapes such as but not limited to circles, diamonds, star patterns or other geometric shapes including stripes of various size and orientation. In one embodiment, one or more of the nucleation sites are interconnected by high surface energy regions. Further, the nucleation sites in some embodiments comprise a uniform surface energy across their area while in other embodiments one or more of the nucleation sites comprise a surface energy gradient. For example, the area of a nucleation site can comprise a smoothly varying gradient or a spatially modulated (e.g. half-tone or fractional area) gradient that increases in surface energy approaching its center. This will cause contaminants to migrate inwards towards the center of the nucleation site. In other embodiments, the geometry of a nucleation site having a uniform surface energy creates net attractive forces that will cause contaminants to migrate inwards towards the center (or other designated point) of the nucleation site. The tapered ray star pattern described in FIGS. 2A and 2B above is one such geometry.

The embodiments described above should not be considered mutually exclusive but may be combined to provide further embodiments contemplated as within the scope of embodiments of the present invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A touch screen human interface device, the device comprising:
    a touch sensitive display surface, the touch sensitive display surface including a first region having a first surface energy with respect to a contaminant material; and
    a pattern of a plurality of nucleation sites distributed within the first region, wherein each of the plurality of nucleation sites possesses a second surface energy that is higher than the first surface energy with respect to the contaminant material;
    wherein at least one of the plurality of nucleation sites comprises a surface energy gradient.

2. The device of claim 1, wherein each of the plurality of nucleation sites has a difference in surface energy with respect to the first region such that the contaminant material will tend to stay within each of the plurality of nucleation sites.

3. The device of claim 1, wherein the first region is one or both of hydrophobic or oleophobic; and
    wherein each of the plurality of nucleation sites have a surface energy that is one or both of oleophilic or hydrophilic.

4. The device of claim 1, wherein the plurality of nucleation sites are coplanar on the display surface with the first region.

5. The device of claim 1, wherein the touch sensitive display surface is textured.

6. The device of claim 1, wherein the plurality of nucleation sites comprises a pattern of geometrically shaped surface energy wells.

7. The device of claim 6, wherein the plurality of nucleation sites comprises a pattern of polygons, circles, diamonds, star patterns, or lines, or a combination thereof.

8. The device of claim 1, wherein a distribution of nucleation sites varies across the touch sensitive display surface such that visibility of displayed information in the presence of the contaminant material varies across the display surface.

9. The device of claim 1, wherein the surface energy gradient increases in surface energy in a direction towards a center of the at least one of the plurality of nucleation sites.

10. The device of claim 1, wherein the pattern of a plurality of nucleation sites comprises less than ten percent of the area of the touch sensitive display surface.

11. The device of claim 1, wherein the first region comprises a low surface energy material applied to the touch sensitive display surface.

12. The device of claim 11, wherein the pattern of a plurality of nucleation sites each comprises an area where the low surface energy material has been removed.

13. A method for providing smudge control for a touch screen human interface device, the method comprising:
    fabricating a transparent substrate for a touch sensitive display surface;
    forming a first region of the transparent substrate to have a first surface energy with respect to a contaminant material; and
    forming within the first region a pattern of a plurality of nucleation sites that are distributed across the first region, wherein each of the plurality of nucleation sites possesses a second surface energy that is higher than the first surface energy with respect to the contaminant material;

wherein the pattern of the plurality of nucleation sites comprises less than ten percent of the area of the touch sensitive display surface.

14. The method of claim 13, wherein the transparent substrate comprises at least in part a low surface energy material applied to a substrate of the touch sensitive display surface.

15. The method of claim 14, wherein the pattern of the plurality of nucleation sites each comprises an area where the low surface energy material has been removed from the transparent substrate.

16. The method of claim 13, wherein the plurality of nucleation sites are substantially coplanar on the display surface with the first region.

17. A transparent substrate for a touch screen human interface device, the transparent substrate comprising:

a first region having a first surface energy with respect to a contaminant material; and a pattern of a plurality of nucleation sites distributed within the first region, wherein each of the plurality of nucleation sites possesses a second surface energy that is higher than the first surface energy with respect to the contaminant material;

wherein a difference in the first surface energy and the second surface energy is such that the contaminant material will tend to stay within each of the plurality of nucleation sites;

wherein at least one of the plurality of nucleation sites comprises a surface energy gradient.

\* \* \* \* \*